H. F. FAGAN.
DEVICE TO PREVENT THEFT OR UNAUTHORIZED USE OF AUTOMOBILES, MOTOR BOATS, AND THE LIKE.
APPLICATION FILED DEC. 5, 1913.
1,140,141.
Patented May 18, 1915.
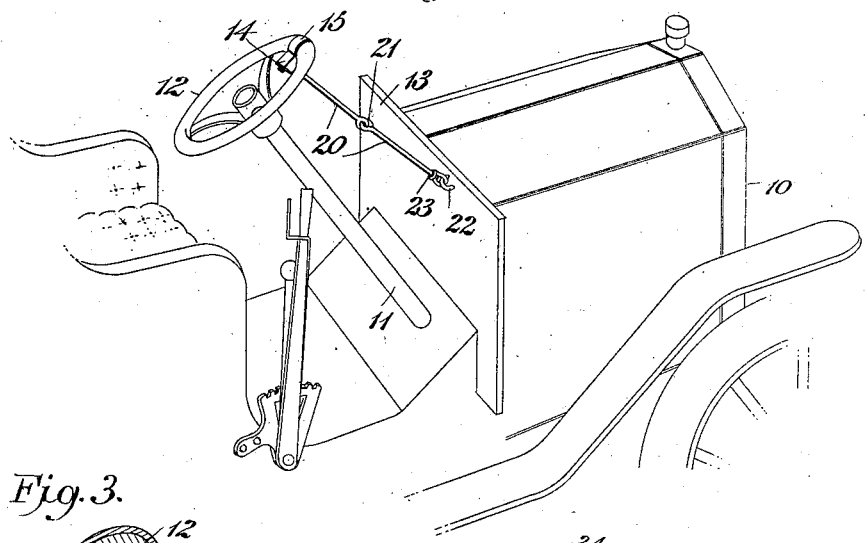
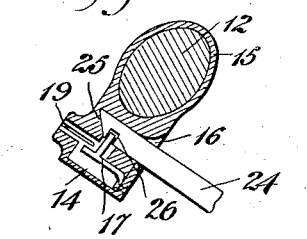
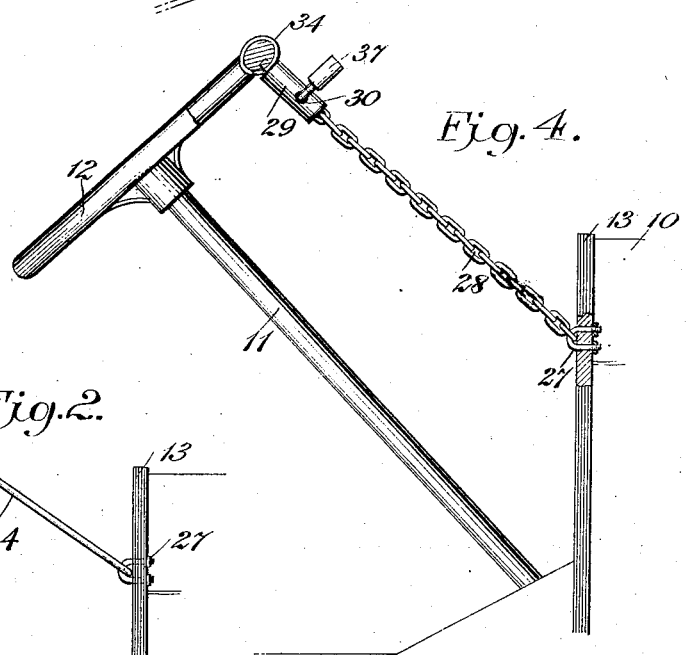
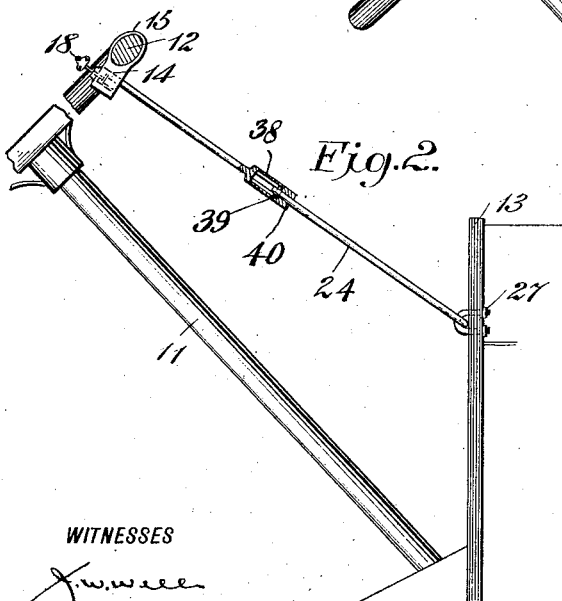
WITNESSES
INVENTOR
Henry F. Fagan
BY
ATTORNEYS

UNITED STATES PATENT OFFICE.

HENRY F. FAGAN, OF NEW YORK, N. Y.

DEVICE TO PREVENT THEFT OR UNAUTHORIZED USE OF AUTOMOBILES, MOTOR-BOATS, AND THE LIKE.

1,140,141.   Specification of Letters Patent.   Patented May 18, 1915.

Application filed December 5, 1913. Serial No. 804,843.

*To all whom it may concern:*

Be it known that I, HENRY F. FAGAN, a citizen of the United States, and a resident of New York city, borough of Manhattan, in the county and State of New York, have invented a new and Improved Device to Prevent Theft or Unauthorized Use of Automobiles, Motor-Boats, and the like, of which the following is a full, clear, and exact description.

This invention relates to an improved device to prevent the theft or unauthorized use of automobiles, motor boats and the like, and the invention comprises a device for locking the steering wheel of the automobile or boat to the body of the vehicle in such a manner as to hold the steering wheel against rotation, and thereby prevent the steering of the vehicle in a desired course. This object is also enhanced, owing to the fact that the steering wheels may be directed toward the curb stone, or toward a tree or obstruction, so that it will be impossible to steer the vehicle outwardly of the obstruction in such a manner as to permit the vehicle to be advanced, it being understood that the locking device is to be of such proportions and structure, that it cannot be broken without giving notice to the owner or someone nearby.

With the above and other objects in view, the invention resides more particularly in the peculiar combination and arrangement of parts which will be illustrated as a preferred embodiment in the accompanying drawings and described in the specification.

Reference is to be had to the accompanying drawings forming a part of this specification, in which similar characters of reference indicate corresponding parts in all the views, and in which—

Figure 1 is a perspective view of a portion of an automobile with the improved device connected to the dashboard and steering wheel as illustrating the application of one form of the invention; Fig. 2 is a fragmentary side elevation of a car and a portion of the steering wheel, with a modified form of structure applied thereto, the steering wheel being shown in section; Fig. 3 is an enlarged vertical sectional view of the steering wheel and lock structure shown in Fig. 2; Fig. 4 is a view similar to Fig 2, but showing the steering wheel broken away and provided with a modified form of locking device and connection with the dashboard; and Fig. 5 is an enlarged sectional view of the connecting device shown in Fig. 4.

In illustrating an embodiment of the invention, there is shown an automobile 10, but it is obvious that the device may be applied to motor boats and other vehicles steered by a wheel. The automobile is shown as provided with a steering post 11, having a steering wheel 12 at its upper end for directing the vehicle in any desired course, while in front of the footboard, is the usual dashboard 13, forming a part of the body of the machine.

The form of the invention shown in Figs. 1, 2 and 3 of the drawings is illustrated as embodying a lock casing 14, having a sleeve portion 15 mounted on the forward portion of the steering wheel during the assemblage of the latter and at a point not easily grasped by the operator, yet located in closest proximity to the dashboard. This casing has an entrance opening 16 and projecting into the area of a passage alined with said opening, is a spring-actuated bolt 17, adapted to be moved out of the area of said passage by a key 18, which is insertible through an opening 19 in the upper part of the casing. Coöperating with the lock in the structure shown in Fig. 1, is a jointed rod, consisting of sections 20 connected by universal movement, as shown at 21, to each other and to the dashboard as shown at 22. This connection with the dashboard is made near the upper edge of the latter and the adjacent portion of the rod is swiveled to the connection, as shown at 23.

The upper end of the rod, either when constructed of jointed sections or of a single section 24, as shown in the Fig. 3, is beveled as shown at 25 and provided with a recess or notch 26, into which the bolt is designed to engage when the rod is forced into the passage of the casing. By inserting and turning the key, the bolt will be disengaged against the action of the spring forming a part thereof, so as to permit the withdrawal of the rod. The connection of the rod with the dashboard may be made by any permanent means, preferably located within the area of the hood, as for instance, a U-clip 27. In Figs. 4 and 5 of the drawings, this clip is also employed, but in lieu of the rods heretofore described, a chain 28 is employed, which together with the steering wheel carries a locking device, to hold the wheel 11 against rotation. The part carried by the chain, consists of a shell 29 having diametrically opposed openings 30 therethrough, while the part carried by the wheel consists of a cylinder or bolt 31, having one side flattened as shown at 32 and engaged in a recess in the steering wheel as shown at 33. A flexible extension 34 is carried by the bolt to form a sleeve, and after being passed around the rim of the wheel is bolted or otherwise secured to the flattened side as shown at 35. The purpose of this, is to permit the cylindrical casing 29 to be readily fitted thereover, whereby the diametrically opposed openings 30 may be brought into alinement with a transverse passage 36 through the bolt 31, so that by the engagement of a pad lock, or the like 37, through said passages or openings, the casing and bolt are secured together and the attaching means of the bolt excluded from view, so that access cannot be had thereto. By this means when the automobile or boat is not in use or is left unguarded, the turning of the steering wheel is prevented and since the car cannot be directed in a straight course under ordinary circumstances, theft or other unauthorized use thereof will be obviated and this is especially enhanced by running the automobile or boat in the direction of an obstruction which cannot be avoided without steering the vehicle. The rod 24 is provided with a slide joint 38 in which the upper part has a slotted casing and the lower part a cross pin 39 engaged therein through a key slot 40 in its bottom.

Having thus described my invention, I claim as new and desire to secure by Letters Patent:—

1. A device to prevent the theft or unauthorized use of automobiles and the like, having a steering wheel with a rim of oval cross section, consisting of a permanent connection with the body of the vehicle in front thereof and means including a part fixed to the rim of the steering wheel against rotation to lock the connection to the steering wheel whereby rotation of the latter and steering of the vehicle is obviated.

2. A locking device for vehicles having a steering wheel, comprising a jointed connection having means to permanently attach the same to the body of the vehicle in front of the wheel and a locking member to attach the connection to the rim of the steering wheel to prevent turning thereof, said locking member being held against rotation on the rim.

3. A locking device of the class described, comprising a jointed connection having means to permanently attach the same to the body of the vehicle in front of the steering wheel and a locking device to attach the connection to the steering wheel of a vehicle to prevent turning thereof, said locking device comprising a sleeve encircling the rim of the wheel and held against rotation and means carried by the sleeve to lock the same to the jointed section.

4. A locking device of the class described, comprising a jointed connection having means to permanently attach the same to the body of the vehicle in front of the steering wheel and a locking device to attach the connection to the steering wheel of a vehicle to prevent turning thereof, said locking device comprising a sleeve encircling the rim of the wheel and having a locking part projecting therefrom, said connection being provided to coöperate with said locking part and to connect the two and conceal one within the other.

5. The combination with a vehicle body and an adjacent steering post having a steering wheel thereon; of a jointed connection permanently secured to the body and a locking mechanism for joining the steering wheel and connection to prevent separation of the two, said locking mechanism comprising a sleeve encircling the rim of the wheel, a bolt fixed to the sleeve and rim against rotation, a casing movably carried by the jointed connection to fit over the bolt to conceal the attachment means thereof and means to lock said bolt and casing together to prevent turning of the steering wheel.

In witness whereof I have signed my name to this specification in the presence of two subscribing witnesses.

HENRY F. FAGAN.

Witnesses:
 JOHN E. BURCH,
 PHILIP D. ROLLHAUS.